United States Patent
Taniguchi et al.

(10) Patent No.: US 9,200,611 B2
(45) Date of Patent: Dec. 1, 2015

(54) CONTROL APPARATUS FOR A MULTI-FUEL INTERNAL COMBUSTION ENGINE

(75) Inventors: Satoshi Taniguchi, Numazu (JP);
Masahiko Masubuchi, Mishima (JP);
Hiroshi Eto, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 278 days.

(21) Appl. No.: 14/001,259

(22) PCT Filed: Feb. 24, 2011

(86) PCT No.: PCT/JP2011/054196
§ 371 (c)(1),
(2), (4) Date: Aug. 23, 2013

(87) PCT Pub. No.: WO2012/114500
PCT Pub. Date: Aug. 30, 2012

(65) Prior Publication Data
US 2013/0327294 A1 Dec. 12, 2013

(51) Int. Cl.
*F02P 17/02* (2006.01)
*F02D 19/06* (2006.01)
*F02P 17/12* (2006.01)
*F02D 19/08* (2006.01)
*F02D 41/00* (2006.01)
*F02P 5/15* (2006.01)
*F02B 11/00* (2006.01)

(52) U.S. Cl.
CPC ............... *F02P 17/12* (2013.01); *F02B 11/00* (2013.01); *F02D 19/06* (2013.01); *F02D 19/0628* (2013.01); *F02D 19/0647* (2013.01); *F02D 19/0692* (2013.01); *F02D 19/081* (2013.01); *F02D 41/0025* (2013.01); *F02P 5/1502* (2013.01); *F02P 17/02* (2013.01); *F02D 41/0027* (2013.01); *F02P 2017/121* (2013.01); *F02P 2017/128* (2013.01); *Y02T 10/36* (2013.01); *Y02T 10/46* (2013.01)

(58) Field of Classification Search
CPC ..... F02P 17/02; F02P 17/12; F02P 2017/121; F02P 2017/128; F02D 19/06; F02D 41/0025; F02D 41/0027; F02D 19/081; F02M 21/02
USPC ............. 123/406.12, 406.13, 406.14, 406.21, 123/406.29, 1 A, 27 GE, 299, 300, 304, 525, 123/526, 575–578; 701/103
See application file for complete search history.

(56) References Cited

U.S. PATENT DOCUMENTS 4,995,367 A * 2/1991 Yamauchi et al. ............. 123/494
6,298,825 B1 * 10/2001 Hupperich et al. ............ 123/431

FOREIGN PATENT DOCUMENTS

| JP | 2007-270750 | 10/2007 |
| JP | 2008-121489 | 5/2008 |
| JP | 2009-24594 | 2/2009 |

*Primary Examiner* — Mahmoud Gimie
(74) *Attorney, Agent, or Firm* — Finnegan, Henderson, Farabow, Garrett & Dunner, L.L.P.

(57) ABSTRACT

The present invention has been made in view of the above-mentioned problems, and is intended to carry out ignition to a mixture in a more stable manner in a multi-fuel internal combustion engine. In the control apparatus for a multi-fuel internal combustion engine which is able to be operated by mixed combustion of a plurality of kinds of fuels, a mixing ratio of the plurality of kinds of fuels is controlled by a mixing ratio control unit, and ignition timing of a spark plug is controlled by an ignition timing control unit, in such manner that a required discharge voltage is made equal to or less than a voltage which is lower by a fixed value than a voltage to be applied to said spark plug (S104, S108).

4 Claims, 6 Drawing Sheets

CONTROL APPARATUS FOR A MULTI-FUEL INTERNAL COMBUSTION ENGINE

CROSS-REFERENCE TO RELATED APPLICATIONS

This application is a national phase application of International Application No. PCT/JP2011/054196, filed Feb. 24, 2011, the content of which is incorporated herein by reference.

TECHNICAL FIELD

The present invention relates to a control apparatus for a multi-fuel internal combustion engine which is able to be operated by mixed combustion of a plurality of kinds of fuels.

BACKGROUND ART

In the past, there have been developed multi-fuel internal combustion engines which are able to be operated by the mixed combustion of a plurality of kinds of fuels. For example, in a first patent document, there is disclosed an internal combustion engine which uses a gas fuel as a main fuel, and a liquid fuel, as an ignition assist fuel. This first patent document describes that in cases where a required discharge voltage exceeds a limit voltage (design voltage) of a spark plug, the liquid fuel in addition to the gas fuel is supplied to the internal combustion engine as the ignition assist fuel.

PRIOR ART DOCUMENTS

Patent Documents

Patent Document 1: Japanese patent application laid-Open No. 2007-270750

DISCLOSURE OF THE INVENTION

Problem to be Solved by the Invention

In an internal combustion engine of a spark ignition type, a required discharge voltage, which is a voltage necessary for an electric discharge to occur in a spark plug, changes according to an operating state of the internal combustion engine. In addition, in a multi-fuel internal combustion engine, a required discharge voltage also changes according to the kind or the mixing ratio of fuels to be used. However, in a normal state, a voltage to be applied to a spark plug is set to a value which satisfies the required discharge voltage so that an electric discharge can be caused to mite a mixture, without regard to the operating state of the internal combustion engine and the kind or the mixing ratio of fuels to be used. Here, note that the voltage to be applied to the spark plug is a design value, and hence is a constant or fixed value irrespective of the operating state of the internal combustion engine, etc.

However, when the degree of deterioration of the spark plug becomes high, or when deposits have accumulated on the electrodes of the spark plug, it will, become difficult for an electric discharge to be generated. In other words, the required discharge voltage goes up in comparison with that in the ordinary or normal state. Ts a result, the required discharge voltage becomes equal to or more than a voltage in the vicinity of the voltage to be applied to the spark plug (including a voltage slightly lower than the voltage to be applied), thus giving rise to a fear that ignition to a mixture by the spark plug may become unstable. Thus, the unstable ignition of the mixture by the spark plug may cause combustion defects such as a misfire, an increase in combustion variation, etc.

The present invention has been made in view of the above-mentioned problems, and has for its object to carry out ignition to a mixture in a more stable manner in a multi-fuel internal combustion engine.

Means for Solving the Problem

The present invention is to control the mixing ratio of a plurality of kinds of fuels and the ignition timing of a spark plug in a multi-fuel internal combustion engine in such a manner that a required discharge voltage is made equal to or less than a voltage which is lower by a fixed value than a voltage to be applied to the spark plug.

More specifically, a control apparatus for a multi-fuel internal combustion engine according to the present invention resides in a control apparatus for a multi-fuel internal combustion engine which is able to be operated by mixed combustion of a plurality of kinds of fuels, and which is provided with:

a spark plug to carry out ignition to a mixture in a cylinder;

a mixing ratio control unit configured to control a mixing ratio of the plurality of kinds of fuels; and an ignition timing control unit configured to control ignition timing of said spark plug based on the mixing ratio of the plurality of kinds of fuels;

wherein the mixing ratio of the plurality of kinds of fuels is controlled by said mixing ratio control unit, and the ignition timing of said spark plug is controlled by said ignition timing control unit, in such manner that a required discharge voltage is made equal to or less than a voltage which is lower by a fixed value than a voltage to be applied to said spark plug.

The relative permittivities or dielectric constants of fuels are different according to the kinds thereof. Under the same condition, the lower the relative permittivity of a fuel, the higher becomes the required discharge voltage. In addition, in cases where a plurality of kinds of fuels are used in a mixed state, under the same condition, the larger the proportion of fuels having relatively low relative permittivities, the higher becomes the required discharge voltage.

On the other hand, the combustion speeds of fuels are also different according to the kinds thereof. The lower the combustion speed of a fuel to be used, the more the ignition timing of the spark plug can be made to advance with respect to the top dead center of the compression stroke. Then, the more the ignition timing of the spark plug is advanced with respect to the top dead center of the compression stroke, the lower becomes the cylinder internal pressure at the time of ignition. If the relative permittivities of fuels are the same, the lower the cylinder internal, pressure, the lower becomes the required discharge voltage.

For that reason, in cases where a fuel A (e.g., a liquid fuel), which has a relatively high relative permittivity and a high combustion speed, and a fuel B (e.g., gas combustion), which has a relatively low relative permittivity and a low combustion speed, are made to burn or combust in a mixed state, when the ignition timing of the spark plug is changed according to the mixing ratio of the fuels, the required discharge voltage will not necessarily become lower in accordance with the larger or higher proportion of the fuel A which is high in relative permittivity.

In other words, the required discharge voltage may become lower in the case where the fuel A and the fuel B are mixed with each other, while advancing the ignition timing of the spark plug, than in the case where only the fuel. A is used (i.e., the mixing proportion of the fuel A being 100%). This is because an influence on the required discharge voltage due to the advancement of the ignition timing of the spark plug (an influence at the falling side of the required discharge voltage) may be larger than an influence on the required discharge voltage due to the reduction or fall of the relative permittivity of the entire fuels (an influence at the rising side of the required discharge voltage).

On the other hand, the required discharge voltage may also become lower in the case where the fuel A and the fuel B are mixed with each other, while retarding the ignition timing of the spark plug, than in the case where only the fuel B is used (i.e., the mixing proportion of the fuel B being 100%). This is because an influence on the required discharge voltage due to the rise of the relative permittivity of the entire fuels (an influence at the falling side of the required discharge voltage) may be larger than an influence on the required discharge voltage due to the retardation of the ignition timing of the spark plug (an influence at the rising side of the required discharge voltage).

In the present invention, the required discharge voltage is regulated in consideration of the property of each fuel as mentioned above. That is, in the present invention, the required discharge voltage is made equal to or less than a voltage which is lower by a fixed value than the voltage to be applied to the spark plug, by controlling the mixing ratio of the plurality of kinds of fuels by means of the mixing ratio control unit, and controlling the ignition timing of the spark plug by means of an ignition timing control unit. According to this, it becomes possible to carry out the ignition of the mixture in a more stable manner in the multi-fuel internal combustion engine, Here, note that if the required discharge voltage is a voltage in the vicinity of the applied voltage to the spark plug (including a voltage slightly lower than the applied voltage) though it is equal to or less than the applied voltage, there is a fear that the ignition to the mixture may become unstable. Accordingly, in this embodiment, the mixing ratio of the plurality of kinds of fuels and the ignition timing of the spark plug are controlled in such a manner that the required discharge voltage is made equal to or less than a voltage which is lower by a fixed value than a voltage applied to the spark plug. The fixed value herein is a value of a voltage difference with the applied voltage at which it becomes possible to carry out the ignition to the mixture in a stable manner.

The control apparatus for a multi-fuel internal combustion engine according to the present invention may be further provided with a defective ignition detection unit which serves to detect defective or poor ignition to the mixture in the cylinder. In this case, when defective ignition is detected by the defective ignition detection unit, the required discharge voltage may be reduced by controlling the mixing ratio of the plurality of kinds of fuels by means of the mixing ratio control unit, and by controlling the ignition timing of the spark plug by the ignition timing control unit. According to this, in cases where there has occurred defective ignition to the mixture, it is possible to eliminate such defective ignition.

The control apparatus for a multi-fuel internal combustion engine according to the present invention may be further provided with a deterioration determination unit which serves to determine whether the degree of deterioration of the spark plug is equal to or more than a predetermined degree of deterioration. In this case, in cases where a determination is made by the deterioration determination unit that the degree of deterioration of the spark plug is equal to or more than the predetermined degree of deterioration, when the operating state of the multi-fuel internal combustion engine belongs to a predetermined high discharge voltage region, the required discharge voltage may be reduced by controlling the mixing ratio of the plurality of kinds of fuels by means of the mixing ratio control unit, and by controlling the ignition timing of said spark plug by the ignition timing control unit.

The higher the degree of deterioration of the spark plug, the more difficult it becomes to generate an electric discharger. For that reason, in cases where the degree of deterioration of the spark plug becomes equal to or higher than a certain extent, when the operating state of the multi-fuel internal combustion engine becomes such that the required discharge voltage is relatively high, it becomes easy to cause defective or poor ignition to the mixture in the cylinder. According to the above, the occurrence of such defective ignition can be suppressed.

Here, note that the predetermined degree of deterioration and the predetermined high required discharge voltage region are beforehand set based on experiments, etc., as a degree of deterioration and an operation region, respectively, in which a judgment can be made that in cases where the degree of deterioration of the spark plug is equal to or more than the predetermined degree of deterioration, when the operating state of the multi-fuel internal combustion engine belongs to the predetermined high required discharge voltage region, it is easy for defective or poor ignition to the mixture to occur.

Effects of the Invention

According to the present invention, in a multi-fuel internal combustion engine, it is possible to carry out ignition to a mixture in a more stable manner.

THE BEST MODE FOR CARRYING OUT THE INVENTION

Hereinafter, specific embodiments of the present invention will be described based on the attached drawings. The dimensions, materials, shapes, relative arrangements and so on of component parts described in the embodiments are not intended to limit the technical scope of the present invention only to them, unless particularly stated.

First Embodiment

Schematic Construction

Figure 1:
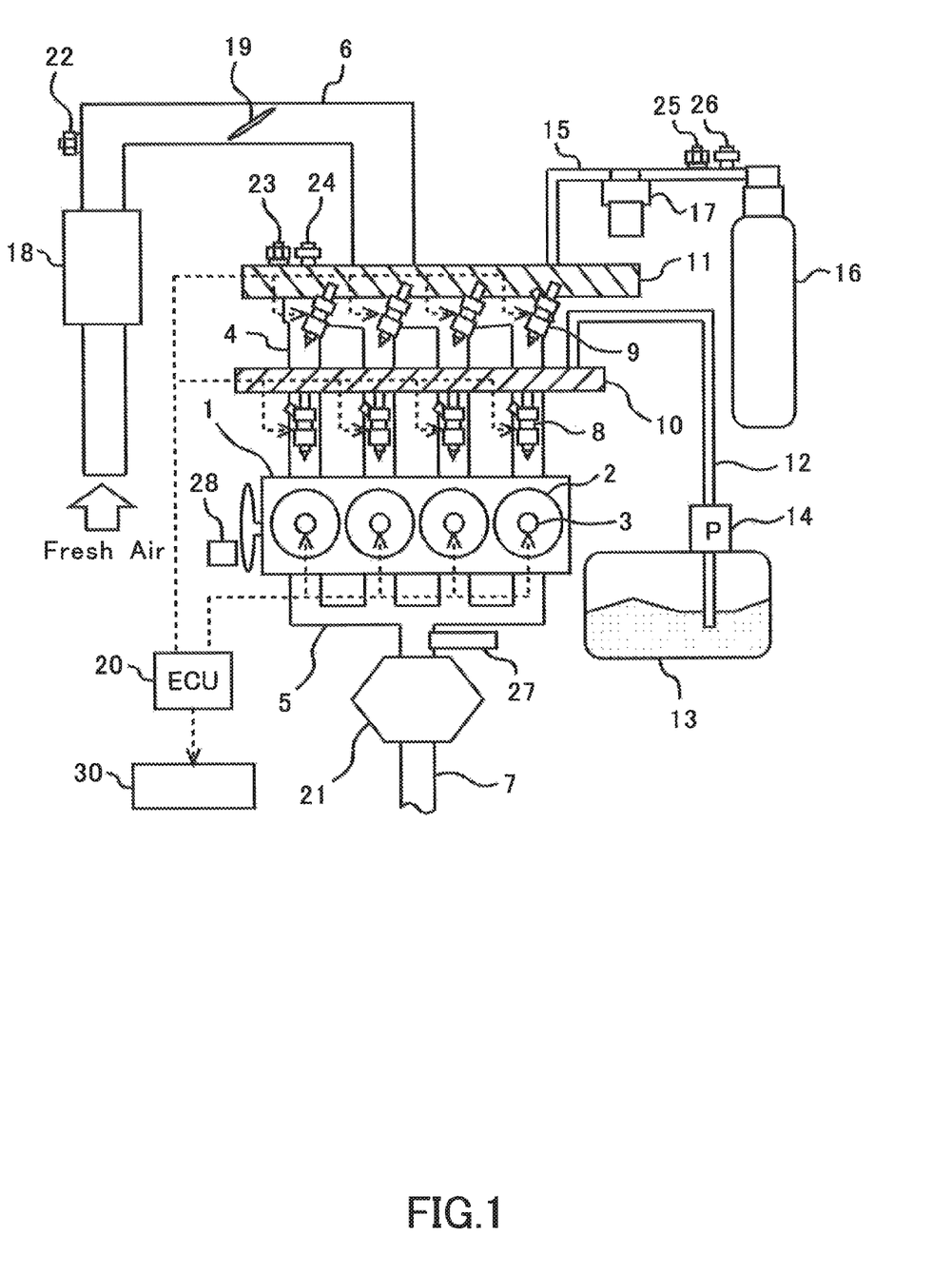
FIG. 1 is a view showing the schematic construction of an internal combustion engine as well as its fuel system and its intake and exhaust systems according to a first embodiment of the present invention.

FIG. 1 is a view showing the schematic construction of an internal combustion, engine as well as its fuel system and its intake and exhaust systems according to this first embodiment of the present invention. The internal combustion engine 1 is a spark ignition type engine for driving a vehicle, which uses gasoline and compressed natural gas (hereinafter referred to as CNG) as fuels. The internal combustion engine 1 is a multi-fuel internal combustion engine which can be operated by combusting gasoline alone or CNG alone, and which can also be operated by combusting gasoline and CNG together in a mixed state.

The internal combustion engine 1 has four cylinders 2. Each of the cylinders 2 is provided with a spark plug 3. A voltage is applied from a battery (not shown) to each spark plug 3. As a result of this, an electric discharge is generated between electrodes of each spark plug 3 which protrude into a combustion chamber in each cylinder 2, so that ignition to a mixture therein is carried out.

An intake manifold 4 and an exhaust manifold 5 are connected to the internal combustion engine 1. An intake passage 6 is connected to the intake manifold 4. An exhaust passage 7 is connected to the exhaust manifold 5. The intake manifold 4 has four branch pipes connected with the individual cylinders 2, respectively. A gasoline injector 8 for injecting gasoline and a CNG injector 9 for injecting CNG are arranged in each of the branch pipes. Here, note that a gasoline injector may be arranged in each cylinder so that gasoline may be injected into the cylinder in addition, similar to this, a CNG injector may be arranged in each cylinder so that CNG may be injected into the cylinder.

The individual, gasoline injectors 8 are connected to a gasoline delivery pipe 10. A gasoline supply passage 12 has one end thereof connected to the gasoline delivery pipe 10, and the gasoline supply passage 12 has the other end thereof connected to a gasoline tank 13. A feed pump 14 is arranged in the gasoline supply passage 12. Gasoline is supplied from the gasoline tank 13 to the gasoline delivery pipe 10 through the gasoline supply passage 12, and it is further supplied from the gasoline delivery pipe 10 to the individual, gasoline injectors 8, respectively.

The individual CNG injectors 9 are connected to a CNG delivery pipe 11. A CNG supply passage 15 has one end thereof connected to the CNG delivery pipe 11, and the CNG supply passage 15 has the other end thereof connected to a CNG tank 16. A regulator 17 is arranged in the CNG supply passage 15. CNG is supplied from the CNG tank 16 to the CNG delivery pipe 11 through the CNG supply passage 15, and it is further supplied from the CNG delivery pipe 11 to the individual CNG injectors 9, respectively.

A pressure sensor 23 for detecting the pressure of CNG in the CNG delivery pipe 11, and a temperature sensor 24 for detecting the temperature of the CNG are arranged in the CNG delivery pipe 11. In addition, a pressure sensor 25 for detecting the pressure of CNG in the CNG supply passage 15, and a temperature sensor 26 for detecting the temperature of the CNG are arranged in the CNG supply passage 15 at the upstream side of the regulator 17.

In the intake passage 6, there are arranged an air cleaner 18, an air flow meter 22 and a throttle valve 19 sequentially in order from an upstream side thereof. An air fuel ratio sensor 27 for detecting the air fuel ratio of an exhaust gas and an exhaust gas purification catalyst 21, which is composed of a three-way catalyst, etc., are arranged in the exhaust passage 7.

An electronic control unit (ECU) 20 is provided in combination with the internal, combustion engine 1. This ECU 20 is a unit that controls an operating state, etc., of the internal combustion engine 1. The air flow meter 22, the pressure sensors 23, 25, the temperature sensors 24, 26, and the air fuel, ratio sensor 27 are electrically connected to the ECU 20. Moreover, a crank angle sensor 28 for detecting a crank angle of the internal combustion engine 1 is also electrically connected to the ECU 20. The output signals of the individual sensors are inputted to the ECU 20. The ECU 20 derives the engine rotational speed of the internal combustion engine 1 based on an output signal of the crank angle sensor 28.

In addition, the individual gasoline injectors 8, the individual CNG injectors 9, the feed pump 14, the regulator 17, and the throttle valve 19 are electrically connected to the ECU 20. Thus, these are controlled by the ECU 20. Further, a warning display unit 30, which is mounted on a vehicle with the internal combustion engine 1 installed thereon, is electrically connected to the ECU 20. The function of the warning display unit 30 will be described later.

[Relation Among Mixing Ratio of Fuels, Required Discharge Voltage, and Ignition Timing]

Figure 2:
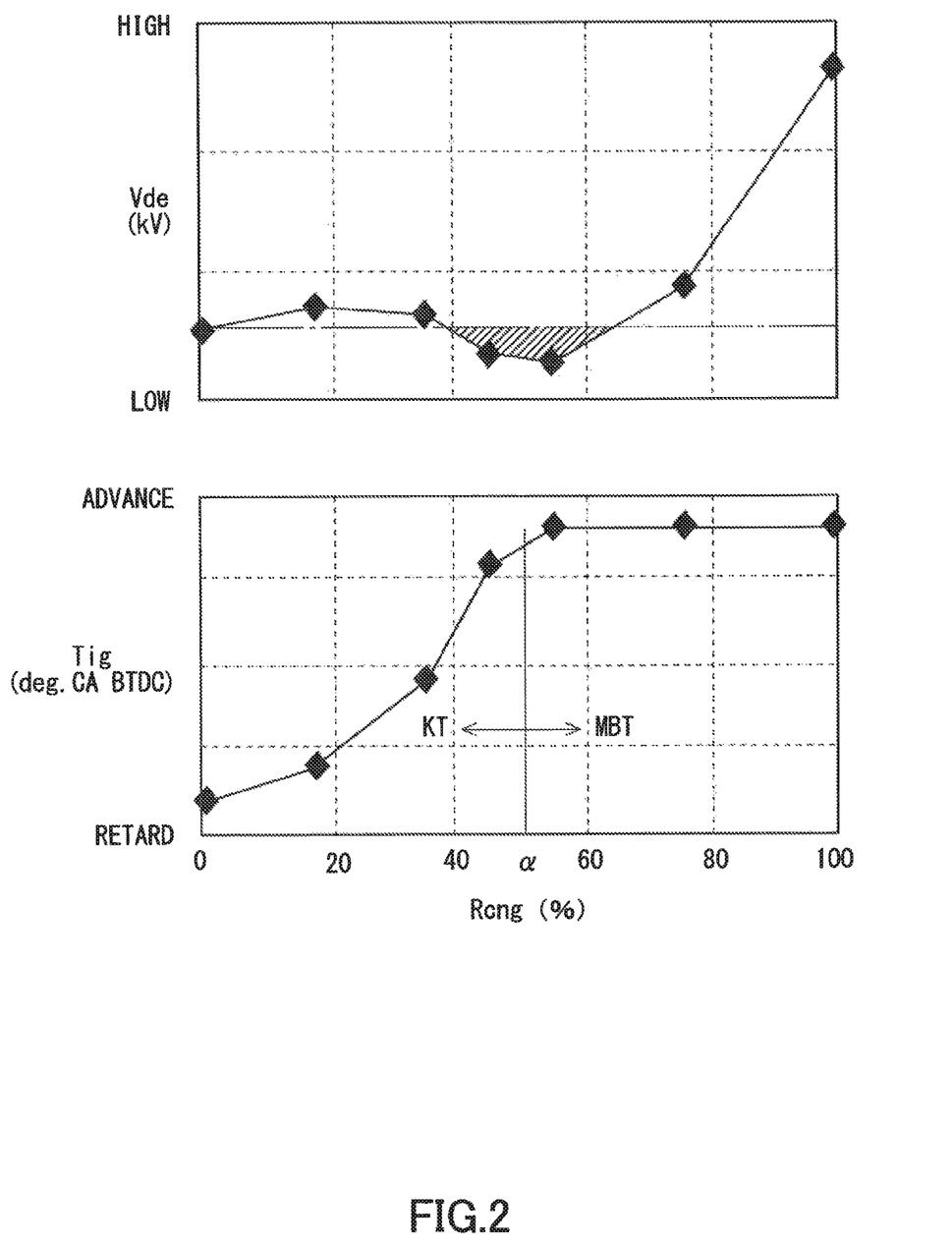
FIG. 2 is a view showing the relation among a required discharge voltage Vde, a mixing ratio Rcng of CNG in entire fuels supplied to the internal combustion engine, and ignition timing Tig of a spark plug.

Now, reference will be made to the relation among the required discharge voltage, the mixing ratio of gasoline and CNG, and the ignition timing of the spark plug according to this embodiment, based on FIG. 2. FIG. 2 is a view showing the relation among a required discharge voltage Vde, a mixing ratio Rcng of CNG in entire fuels supplied to the internal combustion engine 1, and ignition timing Tig of a spark plug 3.

An axis of abscissa in FIG. 2 represents the mixing ratio or proportion Rcng of CNG in the entire fuels supplied to the internal combustion engine 1. The mixing ratio Rcng of CNG being 0% indicates a case where the internal combustion engine 1 is operated on gasoline alone, and the mixing ratio Rcng of CNG being 100% indicates a case where the internal combustion engine 1 is operated on CNG alone. In addition, an axis of ordinate in the upper row of FIG. 2 represents the required discharge voltage Vde. An axis of ordinate in the lower row of FIG. 2 represents the ignition timing Tig of the spark plug 3. In FIG. 2, the ignition timing Tig of the spark plug 3 is represented by an advance angle with respect to the top dead center of compression stroke (BTDC: Before Top Dead Center).

The CNG has a relative permittivity which is low in comparison with gasoline. Accordingly, under the same condition, in the case where only CNG is supplied to the internal combustion engine 1, the required discharge voltage Vde is high, in comparison with the case where only gasoline is supplied to the internal combustion engine 1. In addition, under the same condition, in cases where both gasoline and CNG are supplied to the internal combustion engine 1, the required discharge voltage Vde becomes higher in accordance with the rising or increasing mixing ratio of CNG.

On the other hand, the combustion speed of CNG is low in comparison with that of gasoline. As a result, in cases where the mixing ratio or proportion Rcng of CNG in the entire fuels supplied to the internal combustion engine 1 is equal to or higher than a predetermined ratio α, the ignition timing Tig of the spark plug 3 can be advanced to an MBT (Minimum Advance for Best Torque). However, in cases where the mixing ratio or proportion Rcng of CNG in the entire fuels supplied to the internal combustion engine 1 is lower than the predetermined ratio are α, when the ignition timing Tig of the spark plug 3 is advanced to the MBT, preignition will be caused due to the high combustion speed of the fuel, thus giving rise to knocking. For that reason, in this case, the ignition timing Tig of the spark plug 3 is controlled to a TK (Trace Knock) point which is a point in time later than the MET and which is a threshold value of the ignition timing which can suppress the occurrence of knocking.

Here, the more the ignition timing Tig of the spark plug 3 is advanced with respect to the top dead center of the compression stroke, the lower becomes the cylinder internal pressure at the time of ignition. The lower the cylinder internal pressure, the easier it is for an electric discharge to occur in the spark plug 3. In other words, if the relative permittivities of the fuels supplied to the internal combustion engine 1 are the same, the more is advanced the ignition timing Tig, the lower becomes the required discharge voltage Vde.

Accordingly, even in cases where both gasoline and CNG are supplied to the internal combustion engine 1, when the ignition timing Tig of the spark plug 3 is advanced in accordance with the mixing ratio thereof, there will exist a mixing ratio at which the required discharge voltage Vde becomes equal to or less than that in the case where gasoline alone is supplied to the internal combustion engine 1, as shown in a shaded portion in FIG. 2.

[Control on Fuel Mixing Ratio and Ignition Timing]

In this embodiment, in a normal or ordinary condition, the voltage applied to the spark plug 3 is set to a value which satisfies the required discharge voltage so that an electric discharge can be caused to ignite the mixture, without regard to the operating state of the internal combustion engine 1 and the mixing ratio of CNG and gasoline. The applied voltage is a design value, and hence is a constant or fixed value irrespective of the operating state of the internal, combustion engine 1, etc.

However, in the internal combustion engine 1, the degree of deterioration of the spark plug 3 becomes high, or deposits have accumulated on the electrodes of the spark plug 3, etc., whereby the required discharge voltage may go up in comparison with that in the ordinary or normal state. In such a case, when the required discharge voltage becomes equal, to or more than a voltage in the vicinity of the voltage applied to the spark plug 3, ignition to the mixture by means of the spark plug becomes unstable, thus giving rise to defective or poor ignition.

Figure 3:
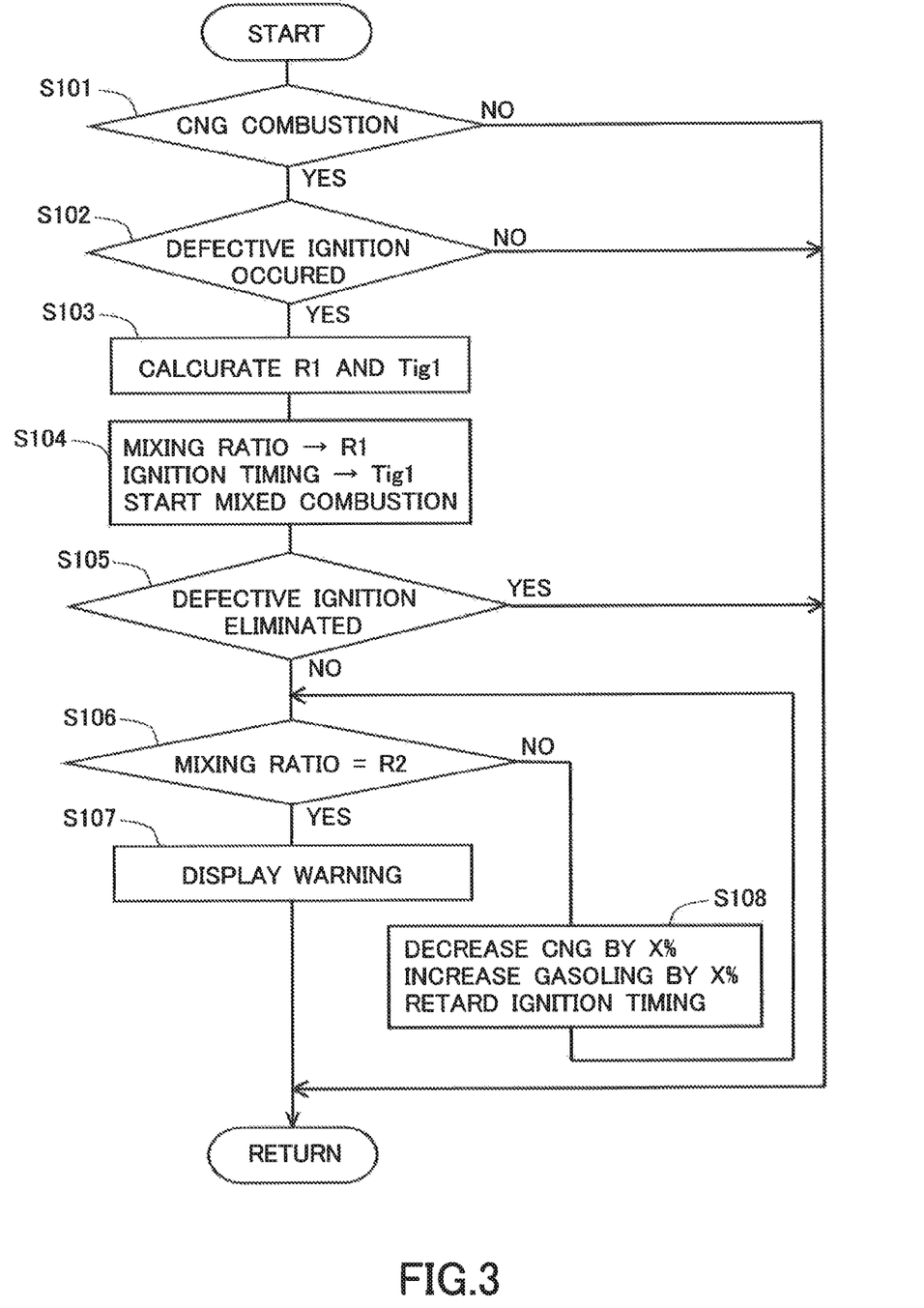
FIG. 3 is a flow chart showing a flow for control of a first fuel mixing ratio and ignition timing according to the first embodiment of the present invention.

Accordingly, in this embodiment, in cases where defective ignition has occurred, the required discharge voltage is made lower by controlling the fuel mixing ratio and the ignition timing in consideration of the above-mentioned characteristics. FIG. 3 is a flow chart showing a flow for control of a first fuel mixing ratio and ignition timing according to this embodiment. This flow shows a flow for control of the fuel mixing ratio and the ignition timing in cases where defective or poor ignition has occurred when CNG combustion is carried out in which only CNG is supplied to the internal combustion engine 1. This flow has been beforehand stored in the ECU 20, and is repeatedly carried out by the ECU 20 at a predetermined interval.

In this flow, first in step S101, it is determined whether CNG combustion is carried out. When a negative determination is made in step S101, the execution of this flow is once ended. On the other hand, in cases where an affirmative determination is made in step S101, then in step S102, it is determined whether defective ignition to the mixture by the spark plug 3 has occurred.

The determination as to whether defective ignition has occurred may be carried out by using any well-known method. For example, based on an amount of variation of the engine rotational, speed of the internal combustion engine 1, the determination as to whether defective ignition has occurred may be carried out. When the amount of variation of the engine rotational speed of the internal combustion engine 1 is larger than a predetermined threshold value, a judgment can be made that defective ignition has occurred. In addition, in cases where a cylinder internal pressure sensor is provided for each cylinder 2, whether defective ignition has occurred can be determined based on a detected value of the cylinder internal, pressure sensor. When the cylinder internal pressure at original or intrinsic ignition timing is smaller than a predetermined threshold value, a judgment can be made that defective ignition has occurred. Moreover, whether defective ignition has occurred can be determined based on the value of an ionic current inside each cylinder 2, the concentration of HO in the exhaust gas discharged from the internal combustion engine 1, or the temperature of the exhaust gas, each of which is a parameter having a high correlation with the state of combustion inside each cylinder 2.

When a negative determination is made in step S102, the execution of this flow is once ended. On the other hand, in cases where an affirmative determination is made in step S102, then in step S103, a first predetermined mixing ratio R1 and a first predetermined ignition timing Tig1 are calculated based on a current operating state of the internal combustion engine 1.

Here, the first predetermined mixing ratio R1 and the first predetermined ignition timing Tig1 are a mixing ratio of CNG and gasoline and an ignition timing by a spark plug 3, in which the required discharge voltage becomes equivalent to that at the time of gasoline combustion in which only gasoline is supplied to the internal combustion engine 1. In this embodiment, a map showing the relation among the acquired discharge voltage Vde, the mixing ratio of CNG and gasoline (i.e., a mixing ratio (proportion) Rcng of CNG in the entire fuels), the ignition timing Tig of the spark plug 3, as shown in FIG. 2, has been stored in advance in the ECU 20, corresponding to each operating state of the internal combustion engine 1. However, an actual required discharge voltage changes according to the degree of deterioration of the spark plug 3, the amount of accumulation of deposits in the electrodes of the spark plug 3, etc. For that reason, the map shows the relation among the required discharge voltage Vde, the mixing ratio of CNG and gasoline, and the ignition timing Tig of the spark plug 3, at the time of assuming that the spark plug 3 is in a predetermined state (e.g., an initial state). The relation among the required discharge voltage Vde, the mixing ratio of CNG and gasoline, and the ignition timing Tig of the spark plug 3, at the time when the spark plug 3 is in the predetermined state, can be obtained based on experiments, etc. In step S103, the first predetermined mixing ratio R1 and the first predetermined ignition timing Tig1 are calculated from the map.

Thereafter, in step S104, mixed combustion in which both CNG and gasoline are supplied to the internal combustion engine 1 is started. At this time, the mixing ratio of CNG and gasoline is controlled to the first predetermined mixing ratio R1, and the ignition timing by the spark plug 3 is controlled to the first ignition timing Tig1. As a result of this, the required discharge voltage is made lower. Then, when the required discharge voltage becomes equal to or less than a voltage which is lower by a fixed value than the voltage applied to a spark plug 3, defective or poor ignition is eliminated. Here, noted that the fixed value herein is a value of a voltage difference with the applied voltage at which it becomes possible to carry out the ignition to the mixture in a stable manner.

Subsequently, in step S105, it is determined whether defective ignition has been eliminated. When an affirmative determination is made in step S105, the execution of this flow is once ended. On the other hand, in cases where a negative determination is made in step S105, then in step S106, it is determined whether the mixing ratio of CNG and gasoline has already reached a second predetermined mixing ratio R2. Here, the second predetermined mixing ratio R2 is a mixing ratio of CNG and gasoline at the time when the required discharge voltage Vde becomes a minimum value on the above-mentioned map showing the relation among the required discharge voltage Vde, the mixing ratio of CNG and gasoline, and the ignition timing Tig of the spark plug 3.

In cases where defective ignition is not eliminated even if the mixing ratio of CNG and gasoline is controlled to the second predetermined mixing ratio R2, it is difficult to eliminate defective ignition even by further changing the mixing ratio of CNG and gasoline and the ignition timing of the spark plug 3. In this case, it can be judged that there has occurred a defect such as one in which the degree of deterioration of the spark plug 3 is very large, or in which large amount of deposits have accumulated on the electrodes of the spark plug 3.

Accordingly, in cases where an affirmative determination is made in step S106, then in step S107, a warning for prompting the driver of the vehicle with the internal combustion engine 1 installed thereon to carry out exchange, repair, or the like, of the spark plug 3 is displayed on the warning display unit 30.

On the other hand, in cases where a negative determination is made in step S106, then in step S108, the mixing ratio of CNG and gasoline is changed. Here, the ratio or proportion of CNG to be supplied to the internal combustion engine 1 is decreased by a predetermined proportion of X %, and the ratio or proportion of gasoline to be supplied to the internal combustion engine 1 is increased by the predetermined proportion of X %. Moreover, in step S108, the ignition timing of the spark plug 3 is retarded to an ignition timing which corresponds to the thus changed mixing ratio of CNG and gasoline. (However, the ignition timing will be maintained if ignition timings corresponding to the mixing ratios of CNG and gasoline before and after the change of the mixing ratio are the same.) That is, in step S108, the mixing ratio of CNG and gasoline and the ignition timing of the spark plug 3 are changed in a direction to further reduce the required discharge voltage. Thereafter, the processing of step S105 is carried out once again.

According to the above-mentioned flow, in cases where defective ignition to the mixture, resulting from the deterioration of the spark plug 3, accumulation of deposits to the electrodes of the spark plug 3, etc., has occurred at the time of CNG combustion, the required discharge voltage can be reduced. Then, by reducing the required discharge voltage to a level equal to or less than a voltage which is lower by the fixed value than the voltage applied to the spark plug 3, it is possible to eliminate defective or poor ignition.

In addition, in cases where defective ignition has occurred at the time of CNG combustion, by changing from the CNG combustion to gasoline combustion, the required discharge voltage may be able to be reduced, whereby defective ignition may be able to be eliminated. However, according to the above-mentioned flow, the required discharge voltage can be reduced, while using CNG as fuel as much as possible. Accordingly, the amount of consumption of gasoline can be suppressed in comparison with the case where CNG combustion is changed to gasoline combustion.

Here, note that, in the above-mentioned flow, in cases where defective ignition has been detected, first, the mixing ratio of CNG and gasoline is controlled to the first predetermined mixing ratio R1, and the ignition timing of the spark plug 3 is controlled to the first predetermined ignition timing Tig1 which corresponds to the first predetermined mixing ratio R1. Then, in cases where defective ignition is not still eliminated, feedback control of the mixing ratio of CNG and gasoline and the ignition timing of the spark plug 3 is carried out within a range until the mixing ratio of CNG and gasoline reaches the second predetermined mixing ratio R2. However, in cases where defective ignition of the spark plug 3 is detected, the mixing ratio of CNG and gasoline may be controlled to the second predetermined mixing ratio R2 from the beginning. In this case, the ignition timing of the spark plug 3 is also controlled to a second predetermined ignition point which corresponds to the second predetermined mixing ratio R2 from the beginning.

Figure 4:
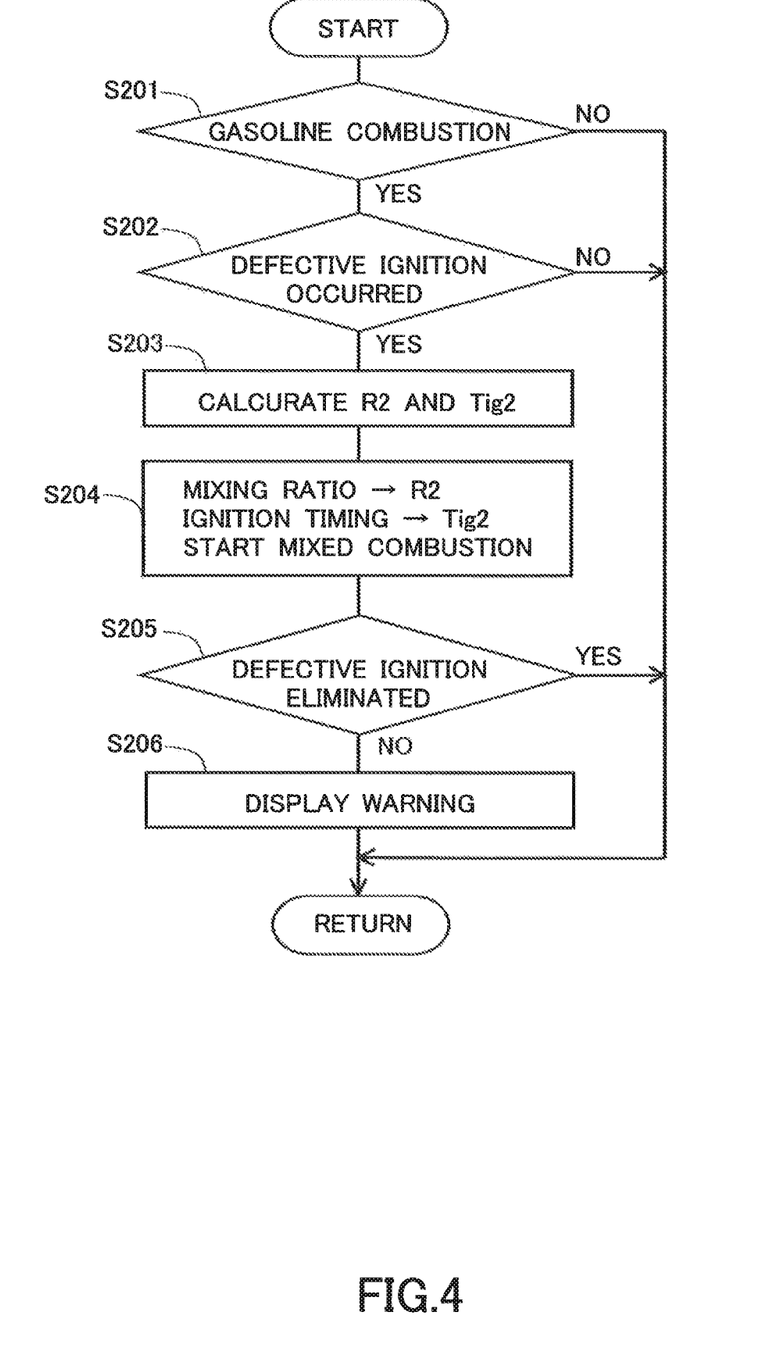
FIG. 4 is a flow chart showing a flow for control of a second fuel mixing ratio and ignition timing according to the first embodiment of the present invention.

FIG. 4 is a flow chart showing a flow for control of a second fuel mixing ratio and ignition timing according to this embodiment. This flow shows a flow for control of the fuel mixing ratio and the ignition timing in cases where defective or poor ignition has occurred when gasoline combustion is carried out in which only gasoline is supplied to the internal combustion engine 1. This flow is beforehand stored in the ECU 20, and is repeatedly carried out by the ECU 20 at a predetermined interval.

In this flow, first in step S201, it is determined whether gasoline combustion is carried out. When a negative determination is made in step S201, the execution of this flow is once ended. On the other hand, in cases where an affirmative determination is made in step S201, it is then determined in step S202 whether defective ignition to the mixture by a spark plug 3 has occurred. The content of processing of the step S202 is the same as the content of processing of the step S102 in the flow chart shown in FIG. 3.

When a negative determination is made in step S202, the execution of this flow is once ended. On the other hand, in cases where an affirmative determination is made in step S202, then in step S203, the second predetermined mixing ratio R2 and the second predetermined ignition timing Tig2 are calculated based on the current operating state of the internal combustion engine 1. As mentioned above, the second predetermined mixing ratio R2 is a mixing ratio of CNG and gasoline at the time when the required discharge voltage Vde becomes a minimum value on the map showing the relation, among the required discharge voltage Vde, the mixing ratio of CNG and gasoline, and the ignition timing Tig of the spark plug 3. In addition, the second predetermined ignition point Tig2 is an ignition timing of the spark plug 3 which corresponds to the second predetermined mixing ratio.

In step S203, the second predetermined mixing ratio R2 and the second predetermined ignition timing Tig2 are calculated from the map which has been stored in the ECU 20 and which shows the relation among the required, discharge voltage Vde, the mixing ratio of CNG and gasoline, and the ignition timing Tig of the spark plug 3, as in the case where the first predetermined mixing ratio R1 and the first predetermined ignition timing Tig1 are calculated in step S103 in the flow chart shown in FIG. 3.

Then, in step S204, mixed combustion in which both CNG and gasoline are supplied to the internal combustion engine 1 is started. At this time, the mixing ratio of CNG and gasoline is controlled to the second predetermined mixing ratio R2, and the ignition timing by the spark plug 3 is controlled to the second ignition timing Tig2. As a result of this, the required discharge voltage is made lower. Then, when the required discharge voltage becomes equal to or less than a voltage which is lower by the fixed value than the voltage applied to the spark plug 3, defective or poor ignition is eliminated.

Subsequently, in step S205, it is determined whether defective ignition has been eliminated. The content of processing of the step S205 is the same as the content of processing of the step S105 in the flow chart shown in FIG. 3. When an affirmative determination is made in step S205, the execution of this flow is once ended. On the other hand, in cases where a negative determination is made in step S205, then in step S206, a warning for prompting the driver of the vehicle with the internal combustion engine 1 installed thereon to carry out exchange, repair, or the like, of the spark plug 3 is displayed on the warning display unit 30. The content of processing of the step S206 is the same as the content of processing of the step S107 in the flow chart shown in FIG. 3.

As mentioned above, when the mixing ratio of gasoline and CNG is controlled to a certain mixing ratio and at the same time the ignition timing of the spark plug 3 is controlled to a timing which corresponds to that mixing ratio, the required discharge voltage Vde may become lower than that at the time of gasoline combustion. According to the above-mentioned flow, in cases where defective ignition has occurred at the time of gasoline combustion, the required discharge voltage is reduced as much as possible by changing from the gasoline combustion to mixed combustion. As a result of this, the required discharge voltage is caused to reduce to a level equal to or less than a voltage which is lower by the fixed value than the voltage applied to the spark plug 3, whereby it is possible to eliminate defective or poor ignition.

Here, note that not only in cases where defective ignition has occurred at the time when CNG combustion or gasoline combustion is carried out, as in the above-mentioned flow, but also in cases where defective ignition has occurred at the time when mixed combustion is carried out, it is possible to eliminate defective or poor ignition by controlling the mixing ratio of CNG and gasoline and the ignition timing of the spark plug 3 so that the required discharge voltage is thereby caused to reduce to a level equal to or less than a voltage which is lower by the fixed value than the voltage applied to the spark plug 3.

In this embodiment, the ECU 20, which carries out the processings of the steps S104 and S108 in the flow chart shown in FIG. 3, or the ECU 20, which carries out the processing of the step S204 in the flow chart shown in FIG. 4, corresponds to a mixing ratio control unit and an ignition timing control unit according to the present invention. In addition, the ECU 20, which carries out the processing of the step S102 in the flow chart shown in FIG. 3, or the ECU 20, which carries out the processing of the step S202 in the flow chart shown in FIG. 4, corresponds to a defective ignition detection unit according to the present invention.

Second Embodiment

Control on Fuel Mixing Ratio and Ignition Timing

The schematic construction of an internal combustion engine, its fuel system and air intake and exhaust system according to this second embodiment is the same as the schematic construction of the internal combustion engine, its fuel system and air intake and exhaust system according to the first embodiment. In the internal combustion engine 1, even with the same operating state and the same fuel(s), the higher the degree of deterioration of the spark plug 3, the higher becomes the required discharge voltage, and hence, the easier it becomes for defective ignition to occur. Accordingly, in this embodiment, in cases where the degree of deterioration of a spark plug 3 becomes equal to or higher than a certain extent, at the time when the operating state of the internal combustion engine 1 becomes such that the required discharge voltage is relatively high, the required discharge voltage is made lower by controlling the fuel mixing ratio and the ignition timing.

Figure 5:
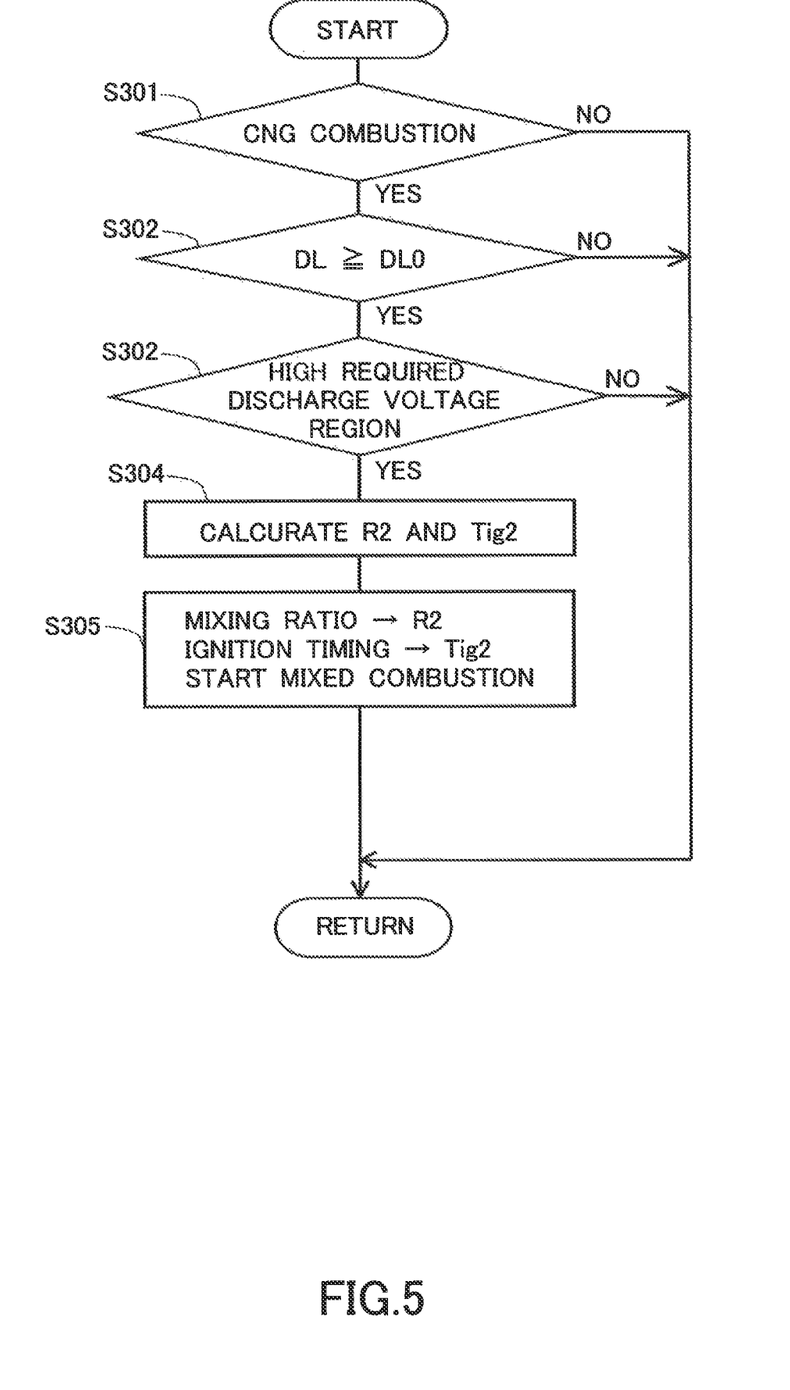
FIG. 5 is a flow chart showing a flow for control of a fuel mixing ratio and ignition timing according to a second embodiment of the present invention.

FIG. 5 is a flow chart showing a flow for control of the fuel mixing ratio and the ignition timing according to this embodiment. This flow is beforehand stored in the ECU 20, and is repeatedly carried out by the ECU 20 at a predetermined interval.

In this flow, first in step S301, it is determined whether CNG combustion is carried out. When a negative determination is made in step S301, the execution of this flow is once ended. On the other hand, in cases where an affirmative determination is made in step S301, then in step S302, it is determined whether the degree of deterioration DL of the spark plug 3 is equal to or more than a predetermined degree of deterioration DL0.

Whether the degree of deterioration DL of the spark plug 3 is equal to or more than the predetermined degree of deterioration DL0 may be determine based on whether the value of a parameter having a high correlation with the degree of deterioration DL has become equal to or more than a predetermined threshold value. As such a parameter having a high correlation with the degree of deterioration DL of the spark plug 3, there can be mentioned by way of example an integrated time of CNG combustion, a mileage (travel distance) of the vehicle on which the internal combustion engine 1 is installed, or an integrated value of a high load operation period of time.

When a negative determination is made in step S302, the execution of this flow is once ended. On the other hand, in cases where an affirmative determination is made in step S302, then in step S303, it is determined whether the current operating state of the internal combustion engine 1 belongs to a predetermined high required discharge voltage region.

Figure 6:
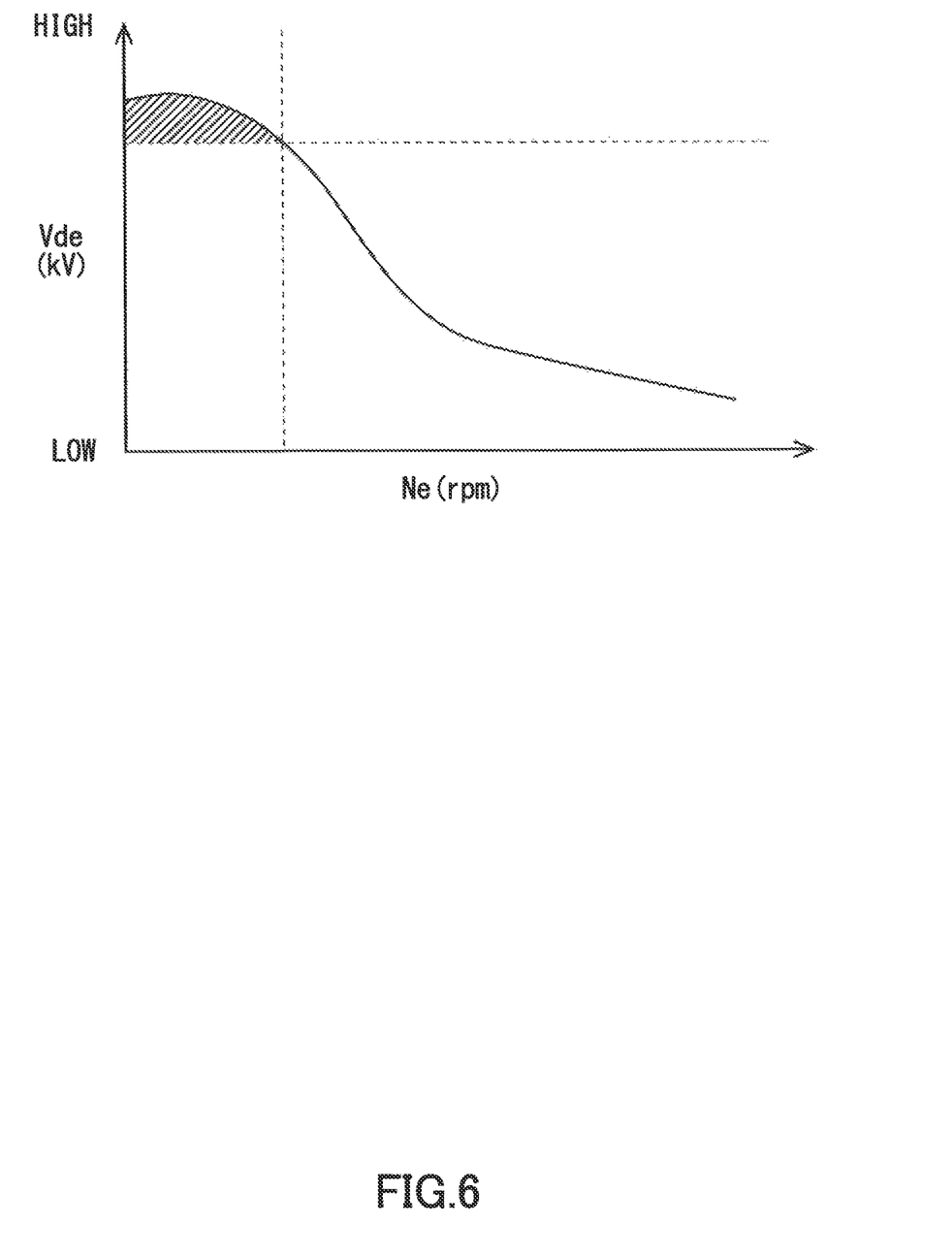
FIG. 6 is a view showing the relation between an engine rotational speed and a required discharge voltage of an internal combustion engine at the time of high load operation thereof according to the second embodiment of the present invention.

FIG. 6 is a view showing the relation between the engine rotational speed and the required discharge voltage of the internal combustion engine 1 at the time of high load operation thereof. In FIG. 6, the axis of abscissa represents the engine rotational speed Ne of the internal combustion engine 1, and the axis of ordinate represents the required discharge voltage Vde. As shown in FIG. 6, the lower the engine rotational speed, the higher becomes the required discharge voltage Vde. In FIG. 6, a diagonally shaded portion corresponds to the predetermined high required discharge voltage region. In addition, the required discharge voltage also changes according to the engine load, too. That is, the higher the engine load, the higher is the required discharge voltage. For that reason, in actuality, the predetermined high required discharge voltage region is set of defined on a three-dimensional map which has, as parameters, the number of engine revolutions per unit time and the engine load. In step S303, by using the map, it is determined whether the operating state of the internal combustion engine 1 belongs to the predetermined high required discharge voltage region.

Here, note that the predetermined degree of deterioration DL0 (or the predetermined threshold value for the parameter having a high correlation with the degree of deterioration DL) and the predetermined high required discharge voltage region have been beforehand set as a degree of deterioration and an operation region, respectively, based on experiments, etc., in which in cases where the degree of deterioration DL of the spark plug 3 is equal to or more than the predetermined, degree of deterioration DL0, when the operating state of the internal combustion engine 1 belongs to the predetermined high required discharge voltage region, a judgment can be made that it is easy for defective or poor ignition to the mixture to occur. These predetermined degree of deterioration DL0 and predetermined high required discharge voltage have been stored in the ECU 20.

When a negative determination is made in step S303, the execution of this flow is once ended. On the other hand, in cases where an affirmative, determination is made in step S303, then in step S304, a second predetermined mixing ratio R2 and a second predetermined ignition timing Tig2 are calculated based on the current operating state of the internal combustion engine 1. As mentioned above, the second predetermined mixing ratio R2 is a mixing ratio of CNG and gasoline at the time when the required discharge voltage Vde becomes a minimum value on the map showing the relation among the required discharge voltage Vde, the mixing ratio of CNG and gasoline, and the ignition timing Tig of the spark plug 3. In addition, the second predetermined ignition point Tig2 is an ignition timing of the spark plug 3 which corresponds to the second predetermined mixing ratio. The content of processing of the step S304 is the same as the content of processing of the step S203 in the flow chart shown in FIG. 4.

Then, in step S305, mixed combustion in which both CNG and gasoline are supplied to the internal combustion engine 1 is started. At this time, the mixing ratio of CNG and gasoline is controlled to the second predetermined mixing ratio R2, and the ignition timing by the spark plug 3 is controlled to the second ignition timing Tig2. As a result of this, the required discharge voltage is made lower. The content of processing of the step S305 is the same as the content of processing of the step S204 in the flow chart shown in FIG. 4.

According to the above-mentioned flow, in cases where defective ignition is easy to occur, the required discharge voltage is reduced as much as possible. Accordingly, it is possible to suppress the occurrence of defective or poor ignition as much as a possible.

Here, note that in the above-mentioned flow, at the time when mixed combustion of CNG and gasoline is started, the mixing ratio of CNG and gasoline may be controlled to the first predetermined mixing ratio R1, and the ignition timing of the spark plug 3 may be controlled to the first ignition timing Tig1. As mentioned above, the first predetermined mixing ratio R1 and the first predetermined ignition timing Tig1 are a mixing ratio of CNG and gasoline and an ignition timing by the spark plug 3, respectively, in which the required discharge voltage becomes equivalent to that at the time of gasoline combustion. Even in cases where control is carried out in this manner, the required discharge voltage can be reduced, thus making it possible to suppress the occurrence of defective ignition. However, in cases where the mixing ratio of CNG and gasoline is controlled to the second predetermined mixing ratio R2, and the ignition timing of the spark plug 3 is controlled to the second ignition timing Tig2, the required discharge voltage can be made lower, and hence, it becomes possible to suppress defective ignition at a higher probability.

In addition, at the time of CNG combustion, the degree of deterioration of the spark plug 3 tends to be facilitated in comparison with at the time of gasoline combustion. For that reason, in the above-mentioned flow, in cases where the operating state of the internal combustion engine 1 belongs to the predetermined high discharge voltage region when the degree of deterioration DL of the spark plug 3 becomes equal to or more than the predetermined degree of deterioration DL0 at the time of CNG combustion, mixed combustion is started so that the required discharge voltage is thereby reduced. However, when the degree of deterioration DL of the spark plug 3 becomes equal to or more than the predetermined degree of deterioration DL0 at the time of gasoline combustion, the same control may be carried out. According to this, the occurrence of defective ignition at the time of gasoline combustion can be suppressed.

In, this embodiment, the ECU 20, which carries out the processing of the step S305 in the flow chart shown in FIG. 5, correspond to the mixing ratio control unit and the ignition timing control unit according to the present invention. In addition, the ECU 20, which carries out the processing of the step S302 in the flow chart shown in FIG. 5, corresponds to a deterioration determination unit according to the present invention.

Other Embodiments

In the above-mentioned first and second embodiments, CNG and gasoline are used as fuels in the internal combustion engine 1. However, the present invention can also be applied to a multi-fuel internal combustion engine which uses other fuels. A gas fuel has a relative permittivity and a combustion speed which are lower in comparison with those of a liquid fuel. Accordingly, the present invention is also applied to a multi-fuel internal combustion engine which uses a gas fuel other than CNG, and a liquid fuel other than gasoline. Hydrogen gas, LPG, or the like can be mentioned, by way of example, as a gas fuel other than CNG. Moreover, methanol, ethanol, or the like can be mentioned, by way of example, as a liquid fuel other than gasoline. In addition, the present invention can also be applied to multi-fuel internal combustion engines which make combined use of fuels, of which relative permittivities and combustion speeds are different from each other, other than the combination of a gas fuel and a liquid fuel.

Moreover, the above-mentioned first and second embodiments can be combined with another.

DESCRIPTION OF THE REFERENCE NUMERALS AND SYMBOLS 1 internal combustion engine
2 cylinders
3 spark plugs
8 gasoline injectors
9 CNG injectors
10 gasoline delivery pipe
11 CNG delivery pipe
15 CNG supply passage
16 CNG tank
20 ECU
27 air fuel ratio sensor
28 crank angle sensor

The invention claimed is:
1. A control apparatus for a multi-fuel internal combustion engine which is able to be operated by mixed combustion of a plurality of kinds of fuels, said apparatus comprising:
   a spark plug to carry out ignition to a mixture in a cylinder;
   a mixing ratio control unit configured to control a mixing ratio of the plurality of kinds of fuels; and
   an ignition timing control unit configured to control ignition timing of said spark plug based on the mixing ratio of the plurality of kinds of fuels;
   wherein the mixing ratio of the plurality of kinds of fuels is controlled by said mixing ratio control unit, and the ignition timing of said spark plug is controlled by said ignition timing control unit, in such manner that a required discharge voltage is made equal to or less than a required discharge voltage at the time when only a fuel having the highest relative permittivity among the plurality of kinds of fuels is made to combust.

2. The control apparatus for a multi-fuel internal combustion engine as set forth in claim 1, further comprising:
a defective ignition detection unit configured to detect defective ignition to a mixture in a cylinder;
wherein in cases where defective ignition has been detected by said defective ignition detection unit, the required discharge voltage is reduced to equal to or less than the discharge voltage required at the time when only the fuel having the highest relative permittivity among the plurality of kinds of fuels is made to combust, by controlling the mixing ratio of the plurality of kinds of fuels by means of said mixing ratio control unit, and by controlling the ignition timing of said spark plug by means of said ignition timing control unit.

3. The control apparatus for a multi-fuel internal combustion engine as set forth in claim 1, further comprising:
a deterioration determination unit configured to determine whether the degree of deterioration of said spark plug is equal to or more than a predetermined degree of deterioration;
wherein in cases where a determination is made by said deterioration determination unit that the degree of deterioration of said spark plug is equal to or more than said predetermined degree of deterioration, when an operating state of the multi-fuel internal combustion engine belongs to a predetermined high discharge voltage region, the required discharge voltage is reduced to equal to or less than the discharge voltage required at the time when only the fuel having the highest relative permittivity among the plurality of kinds of fuels is made to combust, by controlling the mixing ratio of the plurality of kinds of fuels by means of said mixing ratio control unit, and by controlling the ignition timing of said spark plug by means of said ignition timing control unit.

4. The control apparatus for a multi-fuel internal combustion engine as set forth in claim 2, further comprising:
a deterioration determination unit configured to determine whether the degree of deterioration of said spark plug is equal to or more than a predetermined degree of deterioration;
wherein in cases where a determination is made by said deterioration determination unit that the degree of deterioration of said spark plug is equal to or more than said predetermined degree of deterioration, when an operating state of the multi-fuel internal combustion engine belongs to a predetermined high discharge voltage region, the required discharge voltage is reduced to equal to or less than the discharge voltage required at the time when only the fuel having the highest relative permittivity among the plurality of kinds of fuels is made to combust, by controlling the mixing ratio of the plurality of kinds of fuels by means of said mixing ratio control unit, and by controlling the ignition timing of said spark plug by means of said ignition timing control unit.

* * * * *